Sept. 5, 1961 R. J. NELSON 2,998,732
TRANSMISSION AND CONTROL THEREFOR
Filed April 27, 1960 2 Sheets-Sheet 1

INVENTOR.
R. J. NELSON

Sept. 5, 1961 R. J. NELSON 2,998,732
TRANSMISSION AND CONTROL THEREFOR
Filed April 27, 1960 2 Sheets-Sheet 2
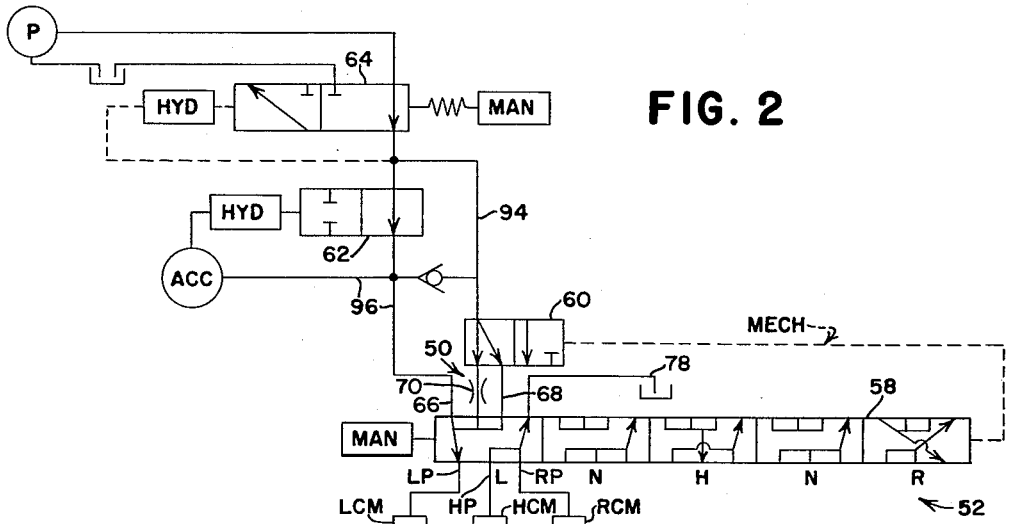
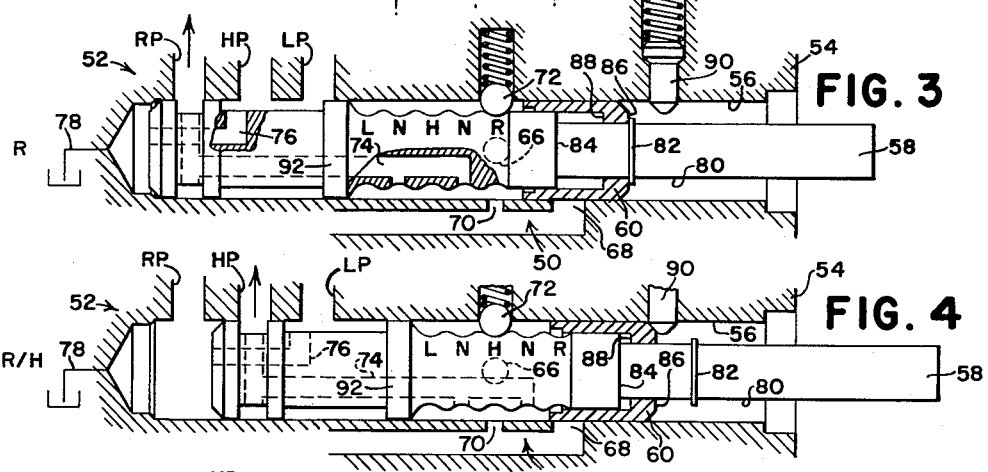
*INVENTOR.*
R. J. NELSON

United States Patent Office 2,998,732
Patented Sept. 5, 1961

2,998,732
TRANSMISSION AND CONTROL THEREFOR
Roger J. Nelson, Cedar Falls, Iowa, assignor to Deere & Company, Moline, Ill., a corporation of Delaware
Filed Apr. 27, 1960, Ser. No. 25,148
15 Claims. (Cl. 74—364)

This invention relates to an improved power transmission and control system therefor. More particularly, the invention relates to a multi-speed multi-range transmission employing fluid-pressure-operated clutches or equivalent drive units and means for selectively controlling same to produce a highly flexible and highly versatile transmission operative in two forward ranges and at least one reverse range.

The invention has for a principal object the provision of a system as aforesaid in which alternation of clutch engagement in forward-forward drive (high-low) may be accomplished at a relatively rapid rate as compared with alternation between the clutches that produce reverse-forward drive. This overall result is desirable because in the transition from high to low, for example, it is desired that this be accomplished without substantial loss of torque. At the same time, in shifting from forward to reverse, because of the change in direction, it is desired that the clutch engagement be at a relatively slower rate so that the shocks incident to the change in direction are cushioned. Yet, it is important in both instances that the change be accomplished as rapidly as possible. The forward-to-reverse changes are significant in the use of a vehicle employed in loading and other material-handling operation. The importance of the relatively rapid change in clutches when effecting shifting from high to low or low to high is obvious, since the forward travel of the vehicle must be maintained without substantial lapse in torque transmission to the traction elements.

Another principal object of the invention is to provide an improved hydraulic control in which a relatively compact control valve means may be utilized, thus achieving a number of positions without unduly increasing the length of the valve spool. For example, in the present case, the valve means is capable of providing six "positions" with a spool movable through only five positions. Even among these six "positions" are two neutral positions which could, in some circumstances, be eliminated, thus giving a four-position valve means in a control valve having actually a three-position valve spool.

The foregoing and other important objects and desirable features inherent in and encompassed by the invention will became apparent as a preferred embodiment thereof is disclosed in detail in the ensuing description and accompanying sheets of drawings, the several figures of which are described below.

FIG. 2 is a schematic view similar to the schematic portion of FIG. 1, but illustrating the control or selector valve in a different position.

FIG. 3 is an enlarged sectional view showing the control valve means in the position in which it produces reverse drive in the transmission.

FIG. 4 is a similar view, illustrating the transition in the range change from reverse to high-speed forward.

FIG. 5 is a similar view but illustrates the change from high- to low-speed forward.

FIG. 6 is again a similar view but illustrates the change between low-speed forward and high-speed forward.

Figure 1:
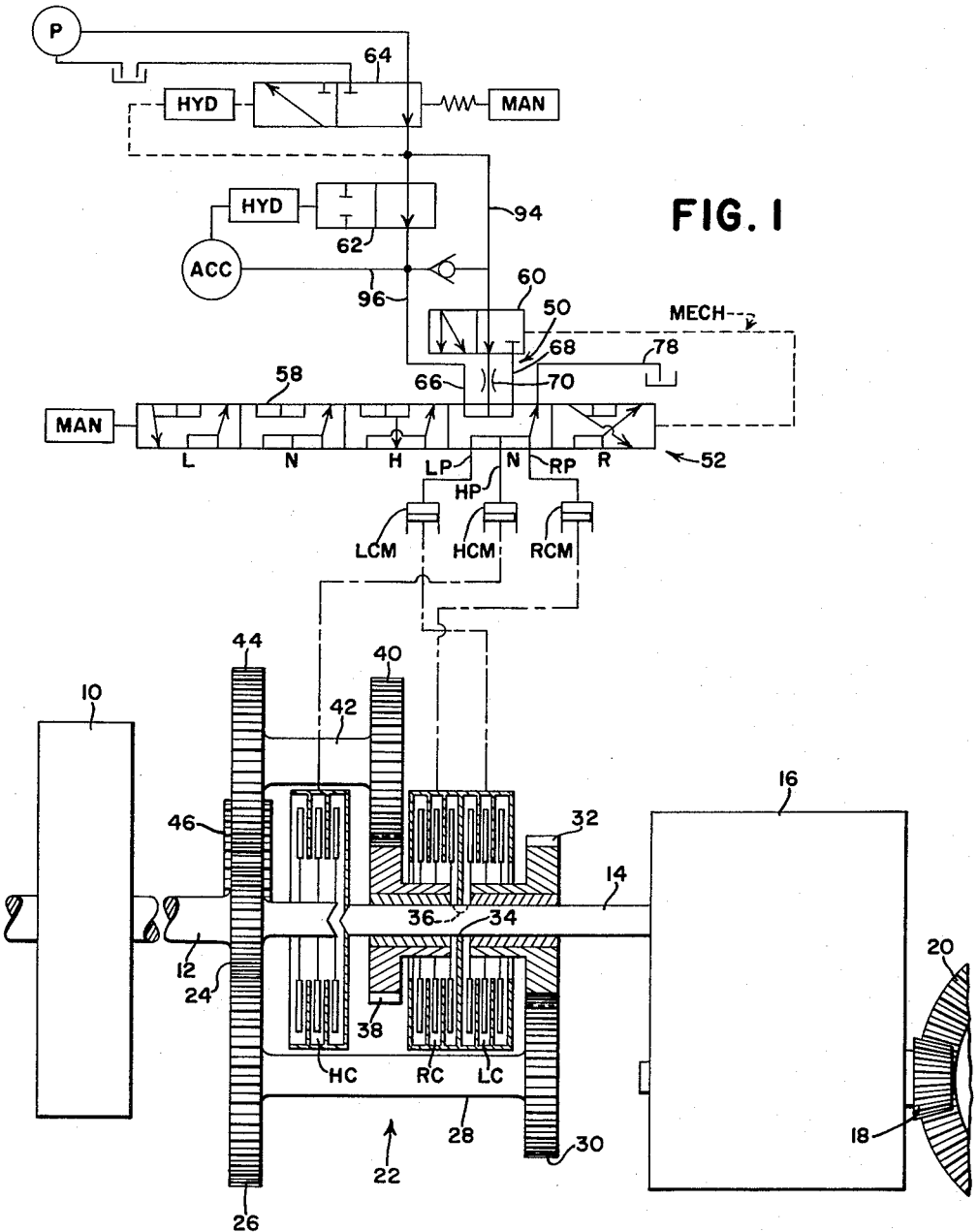
FIG. 1 is a partially schematic and partially sectional view showing a preferred embodiment of the hydraulic control system in conjunction with a multi-range multi-speed transmission.

The transmission to which the control system is applied may be employed in any vehicle, but has been especially designed for use in agricultural and industrial tractors. However, the characteristics of the transmission do not, to a large extent, engraft any limitations onto the invention, and for that reason certain portions of the transmission are shown only generally, such as a flywheel at 10 which is adapted to drive an input shaft 12 which ultimately drives an output shaft 14 which in turn leads to a gear box 16 in which any suitable type of change-speed gearing, for example, may be used to ultimately drive an output bevel pinion 18 which is in constant mesh wtih a bevel gear 20. The latter two components form part of the final drive to the traction wheels, for example, and are, of course, only representative of many final drive trains that could be used.

The significant characteristic of the transmission between the input shaft 12 and the output shaft 14 is that it is capable of producing two speed ratios forward and one speed ratio in reverse. Consequently, whatever number of speeds are provided in the gear box 16 are doubled in the forward direction and all are available in the reverse direction. In a conventional arrangement of this character, the gear box need not include reverse idlers, since reversing is accomplished by the range-change unit, here designated in its entirety by the numeral 22.

This unit includes a high-speed clutch HC, a reverse clutch RC and a low-speed clutch LC. These clutches are selectively and individually engageable to produce high-speed forward, reverse speed and low-speed forward, respectively. The clutches may be of any suitable type and are preferably hydraulically operated, as by individual fluid motors, shown schematically and designated at LCM, HCM and RCM, respectively for the low-speed clutch, the high-speed clutch and the reverse clutch. The dot dash lines from the motors to the clutches represent any suitable mechanical connections. If desired, the pistons in the motors could be incorporated coaxially with the respective clutches, many designs of which are known in the art.

The input and output shafts 12 and 14 are here shown as being coaxial and are so arranged that when the high-speed clutch HC is engaged, direct drive is transmitted from the shaft 12 to the shaft 14. This may be regarded as the high-speed forward range, which may be broken down further by whatever speed ratios are provided in the gear box 16.

The shaft 12 has rigid thereon a low-speed gear 24 which is in constant mesh with the countershaft gear 26 fixed on a countershaft 28 which in turn has a second countershaft gear 30 in constant mesh with a low-speed drive gear 32 journaled on the output shaft 14. The low-speed clutch and the reverse clutch are provided as a unitary arrangement in which a drive plate 34, keyed to the shaft 14 as at 36, is common to both clutches. The driven elements or plates of the clutch LC are keyed or otherwise secured to the gear 32 so that when the clutch LC is engaged, the gear 32 is connected to the shaft 14 which in turn is driven from the input shaft 12 via the countershaft and countershaft gears so as to rotate the shaft 14 at a speed lower than that obtained in direct drive. This of course produces the low-speed forward range which again may be broken down by the number of speed ratios in the gear box 16. It will be readily seen that by alternating engagement between the clutches HC and LC, the operator may select between the two ranges and thus may shift "up" or "down." In addition, the use of the two clutches has the usual advantage of doubling the number of speed ratios in the gear box 16.

The clutch RC has its driven plates connected to a reverse gear 38 which is in constant mesh with a gear 40 keyed to a reverse shaft 42 to which is also keyed a gear 44 in constant mesh with a reverse idler 46 in constant mesh with an driven by the input shaft gear 24. Thus, when the reverse clutch RC is engaged, the output shaft 14 is driven in a reverse direction through the gearing 38—40—42—44—46—24. It is clear, of course, that when one clutch is engaged, the other two are disengaged. It will also be clear that by alternating between the clutches RC and LC, the operator may change from reverse to forward and forward to reverse without making any changes in the gear box 16. Therefore, depending upon the speed ratios developed in the unit 22, the operator may progress forwardly or reversely at the same speeds, or substantially so, which is significant in the use of vehicles employed in loading and other material-handling operations in which it is desirable to approach and back away from a load, for example, as rapidly as possible.

It might be observed at this point that any suitable type of coupling or drive-transmitting means could be used between the flywheel 10 and the shaft 12, but the principles of the invention would still obtain.

The speed ratios in the gear box 16 could be selected by any suitable control lever, either individually or in combination with the means for controlling the clutches, but, since this aspect is not involved here, the disclosure will be devoted to control of the clutches. In a basic system, the control system and clutches could be utilized even where the output shaft 14 is connected directly to the final drive.

For reasons already outline, it is desirable to achieve the alternation between the clutches HC and LC as rapidly as possible, whereas alternation between the reverse clutch and one of the forward clutches, to produce forward-reverse changes, should be accomplished at a relatively lower rate. Although novelty resides in the broad feature of accomplishing range changes at two different rates, it is found that a fluid-pressure-operated system performs more than adequately and accordingly the control of the clutches by hydraulic means will be described.

The basic control circuit is shown in the upper portion of FIG. 1. Since the system is employed in a vehicle, power will be available for driving a fluid-pressure pump P which leads to inlet means 50 of control or selector valve means 52. This valve means includes a valve housing 54 (FIGS. 3–6) in which is formed a chamber or axial valve bore 56 to which the inlet means 50 leads. The valve housing also includes three motor ports, one for each of the clutch motors, and designated at RP, HP and LP. The valve bore 56 carries a main valve in the form of spool 58 and an auxiliary valve 60 which is part of inlet-regulating means, to be presently described.

The circuit further includes an accumulator ACC, an accumulator valve 62 and what may be referred to as a foot valve 64, which is manually controlled, as by a pedal (not shown) as indicated by the box labeled MAN, to represent manual control. The control valve means 52 is similarly labeled in FIG. 2 and in the correspondingly schematic portion of FIG. 1 to represent any suitable manual control thereof. The foot valve 64 and accumulator valve 62 may be hydraulically modulated, as indicated by the boxes marked HYD. The foot valve 64 is normally biased to the position shown but may be changed to a dump position by operating the manual means connected thereto. This will cut off the pump output to the valve 52 and will also dump the pressurized clutch to reservoir in the case of emergencies or other situations in which it is desired to temporarily disable the circuit.

The accumulator valve 62 in the position shown enables charging of the accumulator by the pump to serve a conventional function in maintaining the necessary supply of fluid to effect rapid filling of the selected clutch motor so as to take up slack, etc., in the motor. When the accumulator is charged, the valve 62 will shift to the right of the position shown to cut off pump flow to the accumulator while leaving the accumulator connected to the inlet means 50, which here includes an accumulator inlet 66 in parallel with the admission of pump pressure to the valve 58, for which purpose the inlet means includes an inlet port 68 and an inlet orifice 70. As will be brought out below, the port 68 and orifice 70 combine with the auxiliary valve 60 to establish the regulating means for achieving the two different rates of fluid flow from the inlet means 50 to the motor ports LP, HP and RP.

The valve spool 58 is capable of achieving five positions, here labeled at L, N, H, N, R, standing respectively, of course, for low, neutral, high, neutral and reverse. The purpose of the two neutral positions will be brought out below; although, as will be evident, the system can be designed to function, in a broad sense, without the neutral positions. However, the presence of the neutral positions eliminates the need for disengagement of whatever coupling may be provided between the flywheel 10 and input shaft 12, besides furnishing other advantages that will be clear as the description progresses. The spool 58, as will best appear in FIGS. 3–6, is detented in its several positions, as by a spring-loaded ball 72. The spool is further, as will be clear from FIGS. 3–6 without further description, provided with appropriate lands and grooves as well as internal passages, one of which is a pressure passage 74 and the other of which is a return or reservoir passage 76. The valve chamber or bore 56 is connected to reservoir as at 78. The passages and ports are so arranged that when the valve spool 58 is in either of its neutral positions, all clutch motors are exhausted to reservoir. In any of the active positions, such as L, H or R, the associated clutch motor is pressurized and the other two clutch motors are exhausted.

It will be seen from the general configuration and arrangement of the valve that the H position is centrally between the L and R positions, and that a neutral position is provided at each side of the H position. Thus, the spool 58 has in effect five positions, three of which are significant from the standpoint of representing active positions. In addition, the auxiliary valve 60 provides, in effect, an additional position for the valve means; or, at least, it provides an additional function, and it is arranged so as to have a regulating effect on the inlet means 50, except that it has no effect on the accumulator inlet 66, the fluid from which is always available to prefill the clutch motors so that pump pressure is utilized to complete clutch engagement. It will be understood, of course, that the clutches are biased to disengage.

In the specific embodiment of the valve means 52, the spool 58 and auxiliary valve 60, which is in the form of a sleeve or collar, are coaxially mounted in the bore 56. The sleeve 60 itself is slidable axially in the right hand end of the bore, and the lands at the left hand end of the spool support that end of the spool. The sleeve 60 is apertured so that a coaxial rightward extension 80 of the spool passes loosely through the sleeve, and a proximate portion of the spool is enlarged so as to be slidably supported within the interior of the sleeve. Thus, the spool and sleeve are relatively movable but drive means is provided between the two operative to cause the two to travel in unison at certain times, and, as will be brought out below, this drive means includes lost-motion means of the two-way type, here represented by a pair of abutments on the spool and a cooperating pair of abutments on the sleeve valve 60, the axial spacing between the respective pairs of abutments being different so as to accomplish the lost-motion drive connection. Specifically, the abutments on the spool 58 represent a stop in the form of a snap ring 82 and an axially spaced shoulder 84. The stops or abutments on the collar or sleeve 60 represent opposite faces 86 and 88 of the radial wall of the collar. Thus, the spool 58 is capable of movement relative to the collar 60 by the extent that the axial spacing between the stops 82 and 84 exceeds that between the stop portions 86 and 88.

The collar 60 is designed so that it is operative in two conditions, one of which may be regarded as a fast condition and the other a slow condition. In the fast condition, shown in FIGS. 5 and 6, the collar is in unblocking relation to the inlet port 68. In its slow condition (FIGS. 3 and 4) the collar or valve blocks the inlet port 68. The position of the valve 60 in FIG. 1 corresponds to that in FIGS. 3 and 4 and the position in FIG. 2 corresponds to that of FIGS. 5 and 6. In other words, in the fast condition, the fluid from the pump is suplied to the inlet means through both the orifice 70 and the inlet port 68, whereas in FIGS. 1, 3 and 4, the pump pressure must pass through the orifice 70. In neither position is the accumulator inlet 66 affected. Stated otherwise, in FIG. 2, the valve 60 enables the fluid under pressure to by-pass the orifice 70, but in FIGS. 1, 3 and 4, the fluid pressure must flow through the orifice. This, therefore, establishes regulating means providing two different rates of flow of fluid from the inlet means to the associated motors LCM, HCM and RCM. The fast rate is provided for alternation of the forward clutches LC and HC. The slow condition is provided for alternation of the forward-reverse clutches, here the clutches HC and LC. In other words, the clutch HC is common to both ranges. The coordination between the valve positions and the motor ports LP, HP and RP will be readily recognized; that is to say, the motor port HP is a central port, flanked by the first and second ports represented at LP and RP, and the H position of the valve is a central position flanked by the first and second positions L and R, disregarding the intervening neutral positions N. Hence, when the valve spool 58 is in its H position, the motor port HP is connected to the motor HCM for the high-speed clutch HC, and the valve spool may be alternated selectively in opposite directions from this central position so as to function in two separate ranges in which the position H is common to both. For example, there is one range H—L and another range H—R. The H—L range is the forward-forward or high-low range and the H—R range is the forward-reverse range. In this particular instance, the clutch HC has been chosen as one half of the forward-reverse range; although, it will be apparent that the clutch LC could have been used if desired. The point of significance is that the two ranges have a common clutch, in this instance the clutch HC, and the two ranges of the valve have a common position, here the position H.

The shift of the valve spool 58 from one range to the other is exploited to effect shifting of the auxiliary valve sleeve 60, through the medium of the interengaging abutments 82—84 and 86—88, described above. These are represented schematically by the broken line labeled MECH in FIGS. 1 and 2.

FIG. 4 will best illustrate the central position of the valve spool in which it starts at the H position which, as already described, is common to both the H—L and H—R ranges. At this particular time, the valve 58 has been moved to its H position from its R position and, as an incident to incurring the previous R position, the valve spool 58 has picked up the auxiliary sleeve 60 and moved it to its slow condition in which it blocks the inlet port 68. Thus, the valve 60 in FIG. 4 corresponds to the position of the valve 60 in FIG. 1. The clutch HC is connected or engaged and the vehicle is traveling forwardly. If it is desired to reverse the vehicle travel, the valve 58 is moved to the left to its R position. In other words, the valve is moved in its H—R range. As it does so, there is lost-motion between the abutment 82 and the abutment 86 on the sleeve 60 and accordingly the sleeve 60 is retained in its slow condition, blocking the port 68. Although the spacing between the two abutments 82 and 86 in this case is less than the distance between H and R on the valve spool, which means that the sleeve 60 will be moved, it will be moved to the left and therefore will retain its slow condition, as clearly illustrated in FIG. 3. In the case of the use of the vehicle in a loading or similar operation, it may be desired to alternate between forward and reverse in the same speed ratio as established in the gear box 16 and in such case it is necessary only to shift the valve spool 58 back and forth between H and R, thus alternating the clutches HC and RC. As will be clear from a comparison of FIGS. 3 and 4, as the valve spool 58 is shifted from the R position to the H position, it has limited free travel relative to the sleeve 60 and accordingly, when it moves to its FIG. 4 position, it incurs rightward movement of the sleeve 60, but this rightward movement is limited to an extent in which the sleeve 60 still blocks the port 68. For the purpose of assuring stopping of the sleeve at this point, the housing carries a spring-loaded plunger 90 which is effective to stop the sleeve against the forces exerted by fluid pressure in that portion of the bore 56 between the left hand end of the sleeve 60 and the first land 92 on the valve. However, the spring loading on the plunger 90 is light enough so that shifting of the valve 58 rightwardly beyond the position of FIG. 4 will overcome the action of the plunger so that the sleeve 60 can be moved to the position of FIG. 5, which represents the maximum rightward movement of the spool 58. FIG. 3 represents the maximum leftward movement. In shifting to the left from FIG. 5, there will be some frictional contact between the plunger 90 and sleeve 60, but the snap ring 82 behind the sleeve establishes a positive drive connection so that the sleeve 60 can be moved from its fast condition of FIG. 5 through a range including retention of the fast condition (FIG. 6) and change to its two slow conditions (FIG. 4 and FIG. 3).

FIG. 6 again represents the central or H position of the valve spool 58 but FIG. 6 differs from FIG. 4 in that it represents a condition in which the valve spool 58 is alternated between the H and L positions in the H—L range, thus effecting alternate engagement of the forward clutches HC and LC. It will be seen in FIG. 6 that the sleeve 60 is in its fast condition, uncovering the inlet port tion port 68, so that the inlet means may supply fluid through both the port 68 and the orifice 70, the fluid ultimately reaching the motor port HP via the passage 74, and the other ports are connected to reservoir, the port RP directly and the port LP via the return passage 76.

The fast condition of the sleeve 60 in FIG. 6 has been brought about because of prior movement of the valve 58 to the low condition of FIG. 5, in which case pressure occurring between the land 92 and the sleeve 60 has caused the sleeve 60 to travel to its maximum distance to the right as the spool 58 is also moved its maximum distance to the right. Therefore, when the spool 58 is moved back to the central position of FIG. 6, the stop 82 picks up the sleeve 60 and moves it but only to a position in which it is short of or in unblocking relation to the inlet port 68, thereby in effect retaining its fast condition.

From the foregoing, it will be apparent that the central position H is actually a dual position and in one position is capable of transmitting fluid at a slow rate and in the other condition is capable of transmitting fluid at a faster rate. This of course is a function of the position of the valve sleeve 60 which in turn is controlled by the position or shifting range of the valve spool 58. In short, the valve spool 58 has three basic positions (ignoring the two neutral positions) supplemented by what might be called a fourth position because of the auxiliary valve 60. In other words, the auxiliary valve 60 is part of regulating means which regulates the rate of fluid flow from the inlet means 50 to the associated motor ports, depending upon the range in which the valve spool 58 is moved. The change from one range to the other is exploited to change the condition of the regulating means or auxiliary valve sleeve 60. Thus, the design is significant from the standpoint of producing a multi-position valve without unduly increasing the length of the valve. The same principles would be applicable in a rotary valve in the sense that the several positions are obtained without unduly increasing the angular movement required in the valve which of course is limited by such design characteristics as angular spacing between ports and requirements for internal drilling or porting of the valve spool itself.

At the start of operation of the vehicle, and assuming that the vehicle engine is running to drive the pump P and that the foot valve 64 is in the position shown, the accumulator will be initially charged from the pump via the valve 62, in the position shown, and a branch line 96; and, as accumulator pressure rises, the valve 62 will shift to a position to the right of that shown in FIGS. 1 and 2, causing further charging of the accumulator via a line 94 which carries pump output to the valve 58 and thus delivers to the line 96 through the valve means 52 as follows: The valve 58 will be assumed to be in its neutral position, and the fast or slow condition of the valve 60 is immaterial, because the fluid pressure from the line 94 will ultimately reach the accumulator port 66 through either or both of the inlet port 68 or orifice 70, and will reach the accumulator via 96, until the accumulator is fully charged. Now, with the foot valve 64 remaining in the position illustrated, the selector valve means 58 may be operated to any of its positions as previously described and the accumulator will supply fluid to pre-fill the concerned clutch motor, which will be supplemented by fluid under pressure from the pump to complete the engagement. As already described, the rate of engagement in the H—L or forward-forward range will be relatively rapid, while the rate of engagement in the H—R or forward-reverse range will be relatively slow, for reasons already described.

Features and advantages of the invention other than those enumerated will readily occur to those versed in the art, as will many modifications and alterations in the preferred embodiment disclosed, all of which may be achieved without departure from the spirit and scope of the invention.

What is claimed is:

1. A power transmission comprising: an input shaft; an output shaft; drive mechanism operative to connect the shafts and including a high-speed forward clutch, a low-speed forward clutch and a reverse clutch optionally individually engageable to drive the output shaft respectively at high, low and reverse speeds; control means connected to and for selectively engaging the clutches and operative in a high-low range to alternately engage the two forward clutches and operative in a forward-reverse range to alternately engage one forward clutch and the reverse clutch, said control means including a control member movable selectively in said two ranges, regulating means for controlling the speed of engagement of the clutches, and means interconnecting the regulating means and the control member and operative when the control member moves in its high-low range to effect relatively rapid engagement of the forward clutches and operative when said control member is in its forward-reverse range to effect relatively slower engagement of said one forward clutch and the reverse clutch.

2. A power transmission comprising: an input shaft; an output shaft; drive mechanism operative to connect the shafts and including a high-speed forward clutch, a low-speed forward clutch and a reverse clutch optionally individually engageable to drive the output shaft respectively at high, low and reverse speeds; regulating means for regulating the rate of engagement of the reverse clutch and the one forward clutch and movable between a first position causing relatively slow engagement of said last-named two clutches and a second position causing relatively faster engagement of said last-named two clutches; and control means connected to and for selectively engaging the clutches and operative in a high-low range to alternately engage the two forward clutches and operative in a forward-reverse range to alternately engage one forward clutch and the reverse clutch, said control means including a connection to the regulating means for incurring the first and second positions of said regulating means respectively in the forward-reverse and high-low ranges.

3. A power transmission comprising: an input shaft; an output shaft; drive mechanism operative to connect the shafts and including a high-speed forward clutch, a low-speed forward clutch and a reverse clutch optionally individually engageable to drive the output shaft respectively at high, low and reverse speeds; individual high, low and reverse fluid-pressure motors selectively energizable to respectively energize the clutches; a pressure source; and fluid-pressure supply means for connecting said source selectively to the motors and including a restricted line portion and a by-pass line portion around said restricted line portion, a regulating valve having first and second positions respectively closing and opening said by-pass line portion, a control valve operative in a high-low range to alternately energize the high and low motors and operative in a forward-reverse range to alternately energize the motors respectively for said one forward clutch and the reverse clutch, and a connection between the control valve and the regulating valve for incurring the first and second positions of the regulating valve respectively in the forward-reverse and high-low ranges of the control valve so as to regulate the speed of engagement of the clutches according to the rate of fluid flow established by said regulating valve and said line portions.

4. A power transmission comprising: an input shaft; an output shaft; drive mechanism operative to connect the shafts and including a high-speed forward clutch, a low-speed forward clutch and a reverse clutch optionally individually engageable to drive the output shaft respectively at high, low and reverse speeds; individual high, low and reverse fluid-pressure motors selectively energizable to respectively energize the clutches; a pressure source; and fluid-pressure supply means for connecting said source selectively to the motors and including control valve means operative in a high-low range to alternately energize the high and low motors and operative in a forward-reverse range to alternately energize the motors respectively for said one forward clutch and the reverse clutch, and means operative when the control valve means functions in its forward-reverse range for restricting fluid flow to said one forward motor and the reverse motor for retarding the speed of engagement of the respective clutches.

5. A power transmission comprising: an input shaft; an output shaft; drive mechanism operative to connect the shafts and including a high-speed forward clutch, a low-speed forward clutch and a reverse clutch optionally individually engageable to drive the output shaft respectively at high, low and reverse speeds; individual high, low and reverse fluid-pressure motors selectively energizible to respectively energize the clutches; a pressure source; and fluid-pressure supply means for connecting said source selectively to the motors and including regulating valve means operative in a first position to restrict fluid flow to the motors and opreative in a second position to cause a higher rate of fluid flow, a control valve operative in a high-low range to alternately energize the high and low motors and operative in a forward-reverse range to alternately energize the motors respectively for said one forward clutch and the reverse clutch, and a connection between the control valve and the regulating valve means for incurring the first and second positions of the regulating valve means respectively in the forward-reverse and high-low ranges of the control valve so as to regulate the speed of engagement of the clutches according to the rate of fluid flow established by said regulating valve means.

6. A power transmission comprising: an input shaft; an output shaft; drive mechanism operative to connect the shafts and including a fluid-pressure-operated high-speed forward clutch, a fluid-pressure-operated low-speed forward clutch and a fluid-pressure-operated reverse clutch optionally individually engageable to drive the output shaft respectively at high, low and reverse speeds; a fluid pressure source; and fluid pressure supply and control means connected to the source and controllable to selectively engage the clutches and including a control valve operative in a high-low range to alternately engage the two forward clutches and operative in a forward-reverse range to alternately engage one forward clutch and the reverse clutch, and fluid flow regulating means operative in the forward-reverse range of the control valve to restrict fluid flow to the one forward clutch and the reverse clutch and operative in the high low range of the control valve to achieve a relatively accelerated fluid flow to the forward clutches.

7. Fluid pressure control means, comprising: a valve husing having a valve chamber, a central motor port and first and second motor ports respectively at opposite sides of said central port and all leading from the chamber, and fluid inlet means leading to the chamber; a main valve selectively movable in the chamber among a central position and first and second positions respectively at opposite sides of said central position for connecting the inlet means selectively to the central and first and second motor ports, respectively; means selectively settable to provide fast and slow rates of fluid flow from the inlet means to certain of the motor ports, including an auxiliary valve movable between fast and slow positions; and drive means engageable between the two valves for moving the auxiliary valve to its fast position when the main valve is moved from its first position to its second position and to its slow position when the main control valve is moved from its second to its first position, said drive means including a two-way lost-motion means enabling movement of the main valve back and forth between its central and first positions and back and forth between its central and second positions while leaving the auxilary valve respectively in its slow and fast positions.

8. The invention defined in claim 7, in which: the means providing fast and slow rates of fluid flow includes large and small ports in the valve housing and leading to the chamber, and the auxiliary valve is operative respectively in its slow and fast positions to block and unblock the large port while leaving the small port effective in both positions.

9. The invention defined in claim 7, in which: the valve chamber is an axial bore in which the main valve is axially shiftable; the motor ports are spaced apart axially; the means providing for fast and slow rates of fluid flow includes and inlet port and an inlet orifice axially spaced apart; and the auxiliary valve is movably carried by the housing coaxially with the main valve and is operative respectively in its slow and fast positions to block and unblock the inlet port while leaving the orifice open.

10. The invention defined in claim 9, in which: the auxiliary valve is carried in an axial extension of the bore and has an axial tubular portion opening toward the main valve; and the main valve has an axial extension axially slidably received in said tubular portion.

11. The invention defined in claim 10, in which: the drive means includes a first pair of axially spaced abutments on the main valve and a second pair of abutments spaced apart axially on the auxiliary valve, the axial spacing of the second pair of abutments being different from that of the first pair so as to achieve said two-way lost-motion means.

12. Fluid pressure control means, comprising: a valve housing having a valve chamber, a central motor port and first and second motor ports respectively at opposite sides of said central port and all leading from the chamber, and fluid inlet means leading to the chamber; a main valve selectively movable in the chamber among a central position and first and second positions respectively at opposite sides of said central position for connecting the inlet means selectively to the central and first and second motor ports, respectively; and auxiliary valve means for regulating the rate of fluid flow from the inlet means to the central motor port in the central position of the main valve to optionally provide fast or slow rates of flow.

13. Fluid pressure control means, comprising: a valve housing having a valve chamber, a central motor port and first and second motor ports respectively at opposite sides of said central port and all leading from the chamber, and fluid inlet means leading to the chamber; and valve means carried by the housing and selectively settable among a central position and first and second positions respectively at opposite sides of said central position for connecting the inlet means selectively to the central and first and second motor ports, respectively, said valve means including an element operative in the first position to provide a relatively slow rate of fluid flow from the inlet means to the first motor port, operative in the second position to provide a relatively fast rate to the second motor port, and operative in the central position to optionally provide either said fast rate or said slow rate to the central motor port.

14. Fluid pressure control means, comprising: a valve housing having first and second spaced apart motor ports and a central motor port between them, and fluid inlet means selectively connectible to said ports; valve means movable in the housing between first and second spaced apart positions and a central position between them for leading the inlet means respectively to the first and second and central motor ports, said valve means being operative back and forth in a first range between said central and first positions to alternately pressurize the central and first motor ports and operative back and forth in a second range between said central and third positions to alternately pressurize said central and third motor ports; and fluid-flow regulating means operative in the first range of said valve means to effect a restriction on fluid flow from the inlet means whereby to provide a slow rate of flow to the central and first motor ports and operative in the second range of said valve means to remove said restriction so as to provide a faster rate of flow to the central and third motor ports.

15. Fluid pressure control means, comprising: a valve housing having first and second spaced apart motor ports and a central motor port between them, and fluid inlet means selectively connectible to said ports; valve means movable in the housing between first and second spaced apart positions and a central position between them for leading the inlet means respectively to the first and second and central motor ports, said valve means being operative back and forth in a first range between said central and first positions to alternately pressurize the central and first motor ports and operative back and forth in a second range between said central and second positions to alternately pressurize said central and second motor ports; fluid flow regulating means changeable between a fast condition, to provide for fast fluid flow from the inlet means to the central and first motor ports, and a slow condition to provide for slow fluid flow from said inlet means to said central and second motor ports; and means relating the regulating means to the valve means for selecting between said conditions in response to movement of the valve means from one of its ranges to the other, said relating means being so constructed and arranged that the selected conditions of said regulating means are retained so long as the valve means remains within its respective ranges.

References Cited in the file of this patent

UNITED STATES PATENTS

| | | |
|---|---|---|
| 1,199,640 | Vincent | Sept. 26, 1916 |
| 2,648,992 | Vincent | Aug. 18, 1953 |
| 2,931,237 | Backus | Apr. 5, 1960 |